United States Patent [19]

Chi

[11] Patent Number: 5,246,296
[45] Date of Patent: Sep. 21, 1993

[54] JOURNAL FOR A HEAD TUBE OF A BICYCLE

[76] Inventor: Yi-Chen Chi, No. 139-5, An Mei Rd., Mei Shan Village, Hou Li Hsiang, Taichung Hsien, Taiwan

[21] Appl. No.: 15,358

[22] Filed: Feb. 9, 1993

[51] Int. Cl.⁵ .............................................. B62K 21/18
[52] U.S. Cl. ..................... 384/540; 280/279; 384/517; 384/538
[58] Field of Search .............. 384/490, 504, 513, 517, 384/540, 544, 545, 538; 280/279, 280, 276

[56] References Cited

U.S. PATENT DOCUMENTS

| | | | |
|---|---|---|---|
| 4,303,257 | 12/1981 | Perotti et al. | 280/279 |
| 4,340,238 | 7/1982 | Cabeza | 280/279 |
| 5,163,758 | 11/1992 | Chi et al. | 384/540 |
| 5,197,809 | 3/1993 | Chi | 384/517 X |

Primary Examiner—Thomas R. Hannon
Attorney, Agent, or Firm—Oblon, Spivak, McClelland, Maier & Neustadt

[57] ABSTRACT

A journal includes a lower cap engaged on a head tube, a bearing engaged on the lower cap, a ring engaged on the bearing and having a tapered surface formed in an inner peripheral portion, a upper cap having an annular groove formed in the lower portion, a tapered surface formed in the annular groove of the upper cap and engaged with the tapered surface of the ring. The upper cap applies a downward and radially outward force against the ring when the upper cap moves toward the lower cap such that lower cap, the bearing, the ring and the upper cap can be stably retained in place.

1 Claim, 2 Drawing Sheets

JOURNAL FOR A HEAD TUBE OF A BICYCLE

BACKGROUND OF THE INVENTION

1. Field of the Invention

The present invention relates to a journal, and more particularly to a journal for a head tube of a bicycle.

2. Description of the Prior Art

The closest prior art of which applicant is aware is his prior U.S. Pat. No. 5,163,758 to Chi, filed May 30, 1991. In this patent, a covering and an upper cap are separated and are formed as two individual parts.

The present invention has arisen to provide a novel journal in which the covering and the upper cap are formed integral.

SUMMARY OF THE INVENTION

The primary objective of the present invention is to provide a journal for a head tube of a bicycle which includes fewer parts and includes a compact configuration.

In accordance with one aspect of the invention, there is provided a journal for a head tube of a bicycle comprising a first cap engaged on an upper portion of the head tube and including an annular recess formed therein, a bearing means engaged in the annular recess of the first cap, a ring engaged on the bearing means and including a first tapered surface formed in an inner peripheral portion thereof, a second cap engaged on the ring and including an annular groove formed therein and facing toward the first cap, a second tapered surface formed in the annular groove of the second cap and arranged for engagement with the first tapered surface of the ring such that the second cap applies a downward and radially outward force against the ring when the second cap moves downward toward the first cap, and a compression means engaged on the second cap for applying a downward force against the second cap, whereby, first cap, the bearing, the ring and the second cap are stably retained in place.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
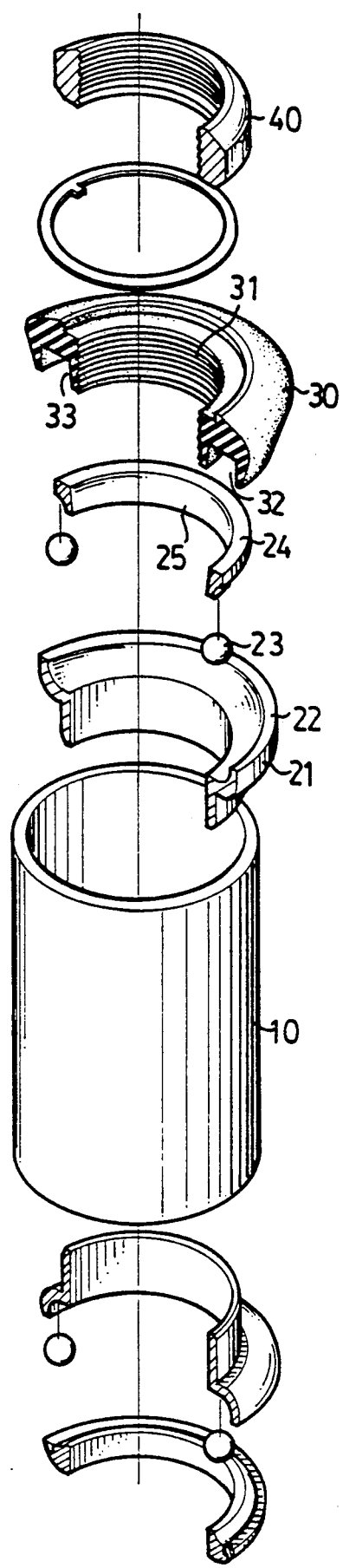
FIG. 1 is an exploded view of a journal in accordance with the present invention.

Referring to the drawings, a journal in accordance with the present invention is generally disposed on the upper portion of a head tube 10, and the steerer tube 12 is rotatably engaged in the head tube 10.

The journal comprises a lower cap 21 fitted in the upper portion of the head tube 10 and having an annular recess 22 formed therein, a bearing or a plurality of balls 23 disposed in the annular recess 22 of the lower cap 21, a ring 24 engaged on the bearing 23 and including a tapered surface 25 formed in the inner peripheral portion thereof, an upper cap 30 including an inner thread 31 formed therein for threaded engaging with the steerer tube 12, an annular groove 32 formed in the upper cap 30 and opening downward and facing toward the lower cap 21, a tapered surface 33 formed in the annular groove 32 for engagement with the tapered surface 25 of the ring 24 and for applying a downward and radially outward force against the tapered surface 25 such that the ring 24 and the upper cap 30 can be stably retained in place. A compression nut 40 is further threadedly engaged on the steerer tube 12 for applying a downward force against the upper cap 30.

Figure 2:
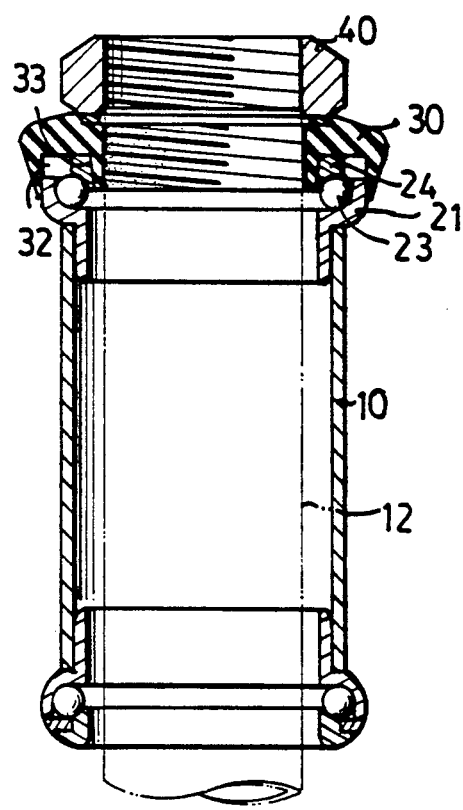
FIG. 2 is a cross sectional view of the journal.

As shown in FIG. 2, the ring 24, the bearing 23 and the lower cap 21 are suitably received in the annular groove 32 of the upper cap 30 and suitably protected by the upper cap 30.

Accordingly, the journal in accordance with the present invention includes a compact configuration and includes fewer parts.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A journal for a head tube of a bicycle comprising a first cap engaged on an upper portion of said head tube and including an annular recess formed therein, a bearing means engaged in said annular recess of said first cap, a ring engaged on said bearing means and including a first tapered surface formed in an inner peripheral portion thereof, a second cap engaged on said ring and including an annular groove formed therein and facing toward said first cap, a second tapered surface formed in said annular groove of said second cap and arranged for engagement with said first tapered surface of said ring such that said second cap applies a downward and radially outward force against said ring when said second cap moves downward toward said first cap, and a compression means engaged on said second cap for applying a downward force against said second cap, whereby, first cap, said bearing, said ring and said second cap are stably retained in place.

* * * * *